Sept. 8, 1936.     P. C. MORRIS     2,054,060
FASTENING DEVICE
Filed Oct. 14, 1935
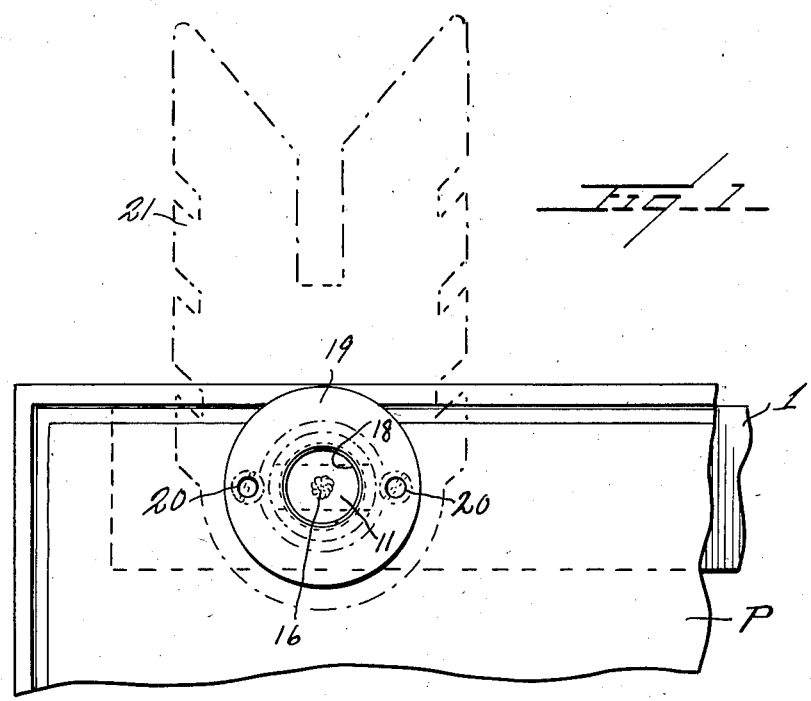
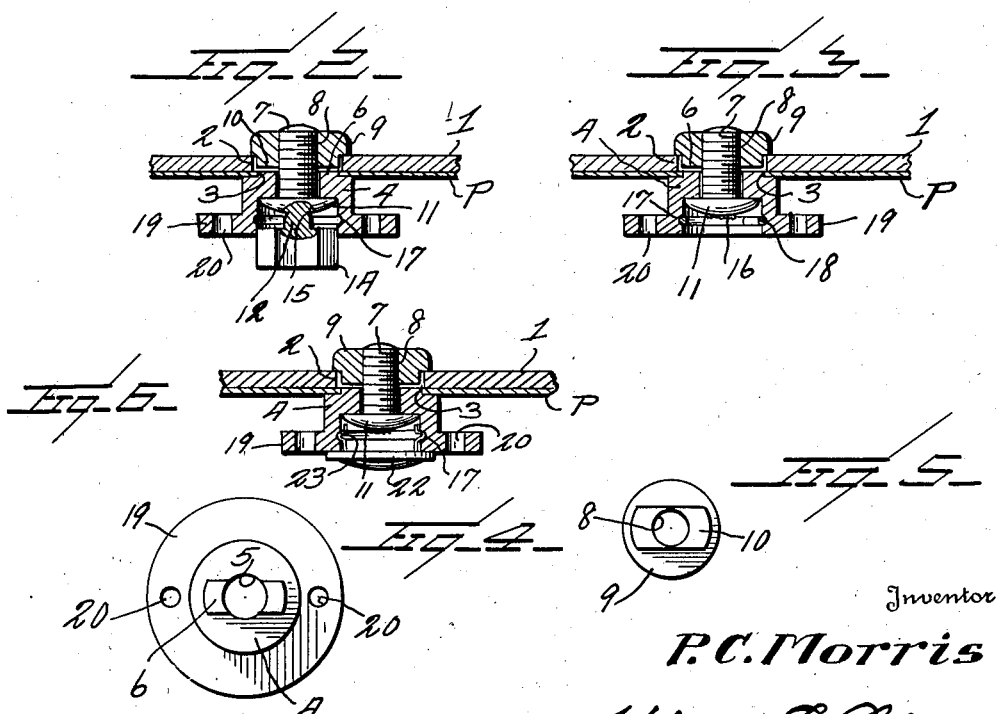
Inventor
P. C. Morris
By Watson E. Coleman
Attorney Patented Sept. 8, 1936

2,054,060

UNITED STATES PATENT OFFICE 2,054,060

FASTENING DEVICE

Pratt C. Morris, Augusta, Ga., assignor of sixty one-hundredths to Wade R. Bedingfield, Augusta, Ga., and ten one-hundredths to Weymon L. Carmichiel, Morgan County, Ga.

Application October 14, 1935, Serial No. 44,938

3 Claims. (Cl. 40—125)

This invention relates to a fastening device, and it is primarily an object of the invention to provide a device of this kind which can be easily applied but which can only be removed with great difficulty.

The invention also has for an object to provide a fastening device to be used in holding an automobile license plate in engagement with its support and in a manner whereby removal can only be effected by mutilation of the plate and/or by cutting through the device proper thereby substantially eliminating losing, substitution or pilfering of the plate.

A further object of the invention is to provide a fastening device including a holding bolt having a head breaking from the shank after the bolt has been turned into effective position, the remaining shank having means associated therewith to prevent its removal without mutilation of the fastening device and/or the work to which it is applied.

The invention consists in the details of construction and in the combination and arrangement of the several parts of my improved fastening device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a fragmentary view in elevation illustrating a fastening device constructed in accordance with an embodiment of my invention in applied position;

Figure 2 is a fragmentary horizontal sectional view taken through the fastening device as illustrated in Figure 1 with portions in top plan;

Figure 3 is a sectional view similar to Figure 2 with the outer head portion removed;

Figure 4 is a view in rear elevation of the housing member as herein embodied;

Figure 5 is a view in elevation of the inner face of the nut as herein embodied;

Figure 6 is a view similar to Figure 3 showing a closure member applied to the housing.

As disclosed in the accompanying drawing, 1 denotes a bracket of a conventional type for use in maintaining a license plate for an automobile in desired position and which plate P and bracket or supporting member 1 are provided with slots 2 and 3 adapted to register with each other in a well known manner.

As herein disclosed my improved fastening device comprises a housing 4 having its outer face open and which has its inner closed end provided radially thereacross and at opposite sides of a central opening 5 with the lugs 6 which are received within the slot 3 in the plate P to hold the housing 4 against rotation when the fastening device is in applied assembly. A threaded shank 7 is insertible from without through the central opening 5 in the closed end of the housing 4 and said bolt extends through the registering slots 2 and 3 so that its free end portion may engage within a central opening 8 of a nut 9. This nut 9 engages the bracket or supporting member 1 from the rear and is provided radially across a face with an elongated rib or lug 10 which is received within the slot 2 of the bracket or supporting member 1 whereby the nut 9 is also held against rotary movement.

The outer end portion of the shank 7 carries a head 11 which is snugly received within the housing 4 or, in other words, the head 11 is of a diameter substantially equal to the internal diameter of the housing 4 so that the periphery of the head 11 closely approaches the side wall of the housing 4 whereby the possibility of inserting an instrument of any kind into engagement with the head 11 is prevented.

When the shank 7 has been turned into its effective position the head 11 is entirely confined within the housing 4 and has direct contact with the closed end of said housing so that the housing is effectively clamped in position as a result of the coaction of the shank 7 with the nut 9. By this means the plate P is securely locked in place.

At its axial center the head 11 has extending therefrom and integrally formed therewith a neck 12 which in turn is integrally formed with a driving head 14 of any desired cross sectional configuration. It is only necessary that this driving head be of a character to effect the gripping therewith of a wrench or kindred tool. The neck 12 at its juncture with the head 11 is provided therearound with a groove 15 to provide a weakened line for a purpose to be hereafter described.

As is illustrated in Figure 2, it is to be noted that the driving head 14 only projects a slight distance within the housing 4 when the shank 7 has been fully locked so that at all times there is a sufficient portion of the driving head 14 disposed outwardly of the housing 4 to permit the effective engagement therewith of a wrench or instrument.

After the shank 7 has been turned to fully lock the same, the pull on the wrench is continued which results in a twisting of the neck 12 causing the same to break at the weakened line 15, said break being generally indicated at 16 in Figures 1 and 3. As illustrated in Figure 3, after the head 14 together with the neck 12 have been broken off the head 11 of the shank 7 is entirely confined within the housing 4 and in a manner to prevent its removal other than by cutting with a cold chisel, grinding or burning off with a torch.

The internal wall of the housing 4 adjacent to its outer or open end is provided therearound with a continuous channel 17 in which is sprung a split ring 18 preferably of spring steel. This split ring when applied has a portion projecting within the housing 4 whereby is provided a shoulder to afford further means to prevent the head 11 passing therebeyond. While the need of this ring 18 under ordinary conditions is not required, yet I provide the same to meet any possible contingency which does not at present present itself.

The outer or open end of the housing 4, as herein disclosed, is defined by an outstanding flange 19 having diametrically opposed openings 20 whereby if desired a suitable ornament as indicated by broken lines at 21 may be bolted or otherwise attached thereto to extend over the outer open face of the housing 4.

In Figure 6 I illustrate a fastening device similar to that disclosed in the other figures but wherein I use a fanciful button 22 having spring arms 23 which, when forced within the housing 4, engage within the groove 17 to hold the button 22 in position. When applied this button 22 closes the outer or open face of the housing 4. It is believed to be apparent that the applied button 22 as illustrated in Figure 6 as well as the applied ornament as indicated by broken lines at 21 in Figure 1 will also obstruct the outward movement of the head 11 of the shank 7.

From the foregoing description it is thought to be obvious that a fastening device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A fastening device of the character described comprising a housing having one end closed and the other end open, the closed end of the housing having an opening, a headed shank extending through said opening in the housing, a nut engaging the shank, a driving head, a neck connecting the head of the shank and the driving head, said driving head extending beyond the open end of the housing when the head of the shank is in contact with the closed end of the housing, and a member engaging the open end portion of the housing to obstruct the outward movement of the head of the shank after the driving head has been broken off.

2. A fastening device of the character described comprising a housing having one end closed and the other end open, the closed end of the housing having an opening, a headed shank extending through said opening in the housing, a nut engaging the shank, a driving head, a neck connecting the head of the shank and the driving head, said driving head extending beyond the open end of the housing when the head of the shank is in contact with the closed end of the housing, and a member within the open end portion of the housing to obstruct the outward movement of the head of the shank after the driving head has been broken off.

3. A fastening device of the character described comprising a housing having one end closed and the other end open, the closed end of the housing having an opening, a headed shank extending through said opening in the housing, a nut engaging the shank, a driving head, a neck connecting the head of the shank and the driving head, said driving head extending beyond the open end of the housing when the head of the shank is in contact with the closed end of the housing, and a member within the open end portion of the housing to obstruct the outward movement of the head of the shank after the driving head has been broken off, said member extending across the open end portion of the housing.

PRATT C. MORRIS.